US007835813B2

(12) United States Patent
Wang et al.

(10) Patent No.: US 7,835,813 B2
(45) Date of Patent: Nov. 16, 2010

(54) SYSTEM AND METHOD FOR MANAGING A PRODUCT MANUFACTURING PROCESS

(75) Inventors: Chi-Chih Wang, Taipei Hsien (TW); Bing-Yu He, Shenzhen (CN); Xian-Feng Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Tapei Hsien (TW)

( * ) Notice: Subject to any disclaimer, the term of this patent is extended or adjusted under 35 U.S.C. 154(b) by 492 days.

(21) Appl. No.: 11/957,415

(22) Filed: Dec. 15, 2007

(65) Prior Publication Data
US 2008/0234851 A1 Sep. 25, 2008

(30) Foreign Application Priority Data
Mar. 20, 2007 (CN) .................... 2007 1 0200303

(51) Int. Cl.
*G06F 19/00* (2006.01)
(52) U.S. Cl. .................... 700/107; 700/95; 700/106; 705/8; 705/7; 705/1
(58) Field of Classification Search ............ 700/95, 700/107, 106; 705/8, 7, 1
See application file for complete search history.

(56) References Cited

U.S. PATENT DOCUMENTS

| 2003/0158769 | A1 | 8/2003 | Uno et al. |
| 2004/0064351 | A1* | 4/2004 | Mikurak ................... 705/7 |
| 2007/0150387 | A1* | 6/2007 | Seubert et al. ............ 705/31 |

* cited by examiner

*Primary Examiner*—Albert DeCady
*Assistant Examiner*—Tejal J Gami
(74) *Attorney, Agent, or Firm*—Frank R. Niranjan

(57) ABSTRACT

A method for managing a product manufacturing process is disclosed. The method includes the steps of downloading a bill of materials of the product from a first database according to a serial number and an edition of the product; downloading a production order from a second database according to the production order number; downloading received materials delivery receipts from the second database according to corresponding numbers of the received materials delivery receipts; obtaining product information and manufacturing information of downloaded production order; obtaining serial numbers and editions of corresponding materials; obtaining received materials information from the downloaded received materials delivery receipts; creating a manufacturing check list according to obtained information; and saving the manufacturing check list in the application server, and creating a serial number of the manufacturing check list; assigning one or more preconfigured product tracking numbers to the manufacturing check list.

4 Claims, 3 Drawing Sheets

SYSTEM AND METHOD FOR MANAGING A PRODUCT MANUFACTURING PROCESS

BACKGROUND OF THE INVENTION

1. Field of the Invention

The present invention relates to a system and method for managing a product manufacturing process.

2. Description of Related Art

A known managing system collects various kinds of information concerning resources, materials, parts and assemblies used to manufacturing a product. An art of managing a product manufacturing process is disclosed in patent application such as US Published Patent Application U.S. 2003/0158769 A1 discloses a method of managing a supply chain by a computer system. This invention can be utilized to manage product supply process from the raw materials supply by a raw material supply company to the production of products. However, the manufacturing process management in the prior art is processed during the manufacturing of the products, there is no manufacturing process management after the manufacturing of the products.

What is needed, therefore, is a system for managing a product manufacturing process, which can be used for providing a versatile, flexible and comprehensive tracking technique for a manufacturing process.

Similarly, what is also needed is a method for managing a product manufacturing process, i.e., for providing a versatile, flexible and comprehensive tracking technique for a manufacturing process.

SUMMARY OF THE INVENTION

A system for managing a product manufacturing process is disclosed. The system includes a first database, a second database, and an application server electronically connected with the first database and the second database via a network. The application server includes a downloading module for downloading a bill of materials of the product from the first database according to a serial number and an edition of the product, and saving the downloaded bill of materials to an application server, downloading a production order from the second database according to the production order number, and saving the downloaded production order to the application server, downloading received materials delivery receipts from the second database according to corresponding numbers of the received materials delivery receipts, and saving the downloaded received materials delivery receipts to the application server; an obtaining module for obtaining product information from the downloaded production order, obtaining manufacturing information from the downloaded production order, obtaining serial numbers and editions of corresponding materials used in manufacturing the product from the downloaded bill of materials, obtaining received materials information from the downloaded received materials delivery receipts; a creating module for creating a manufacturing check list according to above obtained information; a saving module for saving the manufacturing check list in the application server, and creating a serial number of the manufacturing check list; and an assigning module for assigning one or more preconfigured product tracking numbers stored in the application server to the manufacturing check list.

Another preferred embodiment provides a method for managing a product manufacturing process. The method includes the steps of downloading a bill of materials of the product from a first database according to a serial number and an edition of the product, and saving the downloaded bill of materials to an application server; downloading a production order from a second database according to the production order number, and saving the downloaded production order to the application server; downloading received materials delivery receipts from the second database according to corresponding numbers of the received materials delivery receipts, and saving the downloaded received materials delivery receipts to the application server; obtaining product information from the downloaded production order; obtaining manufacturing information from the downloaded production order; obtaining serial numbers and editions of corresponding materials used in manufacturing the product from the downloaded bill of materials; obtaining received materials information from the downloaded received materials delivery receipts; creating a manufacturing check list according to above obtained information; saving the manufacturing check list in the application server, and creating a serial number of the manufacturing check list; and assigning one or more preconfigured product tracking numbers stored in the application server to the manufacturing check list.

Other advantages and novel features of the present invention will become more apparent from the following detailed description of preferred embodiment when taken in conjunction with the accompanying drawings.

DETAILED DESCRIPTION OF THE INVENTION

Figure 1:
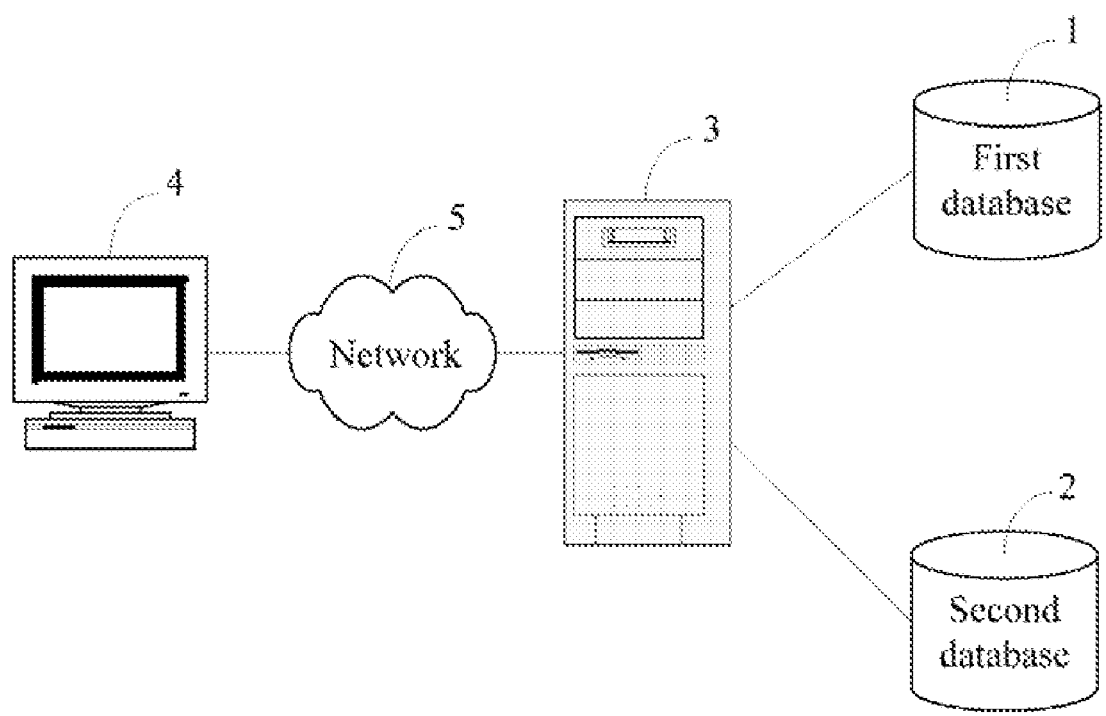
FIG. 1 is a schematic diagram of hardware configuration of a system for managing a product manufacturing process in accordance with a preferred embodiment.

FIG. 1 is a schematic diagram of hardware configuration of a system for managing a product manufacturing process (hereinafter, "the system") in accordance with a preferred embodiment of the present invention. The system typically includes a first database 1, a second database 2, and an application server 3 electronically connected with the first database 1 and the second database 2 via a network 5. The system may further include one or more client computers 4. The first database 1 is used for storing a bill of materials of the product. The second database 2 is used for storing a production order of the product and received materials delivery receipts of materials used in manufacturing the product. The application server 3 is used for downloading the bill of materials from the first database 1, and the production order and received materials delivery receipts from the second database 2, creating a manufacturing check list according to downloaded information, and assigning one or more preconfigured product tracking numbers stored therein to the manufacturing check list. The clients 4 connect with the application server 3 via the network 5, and each provides an operation interface for users to perform corresponding operations.

Figure 2:
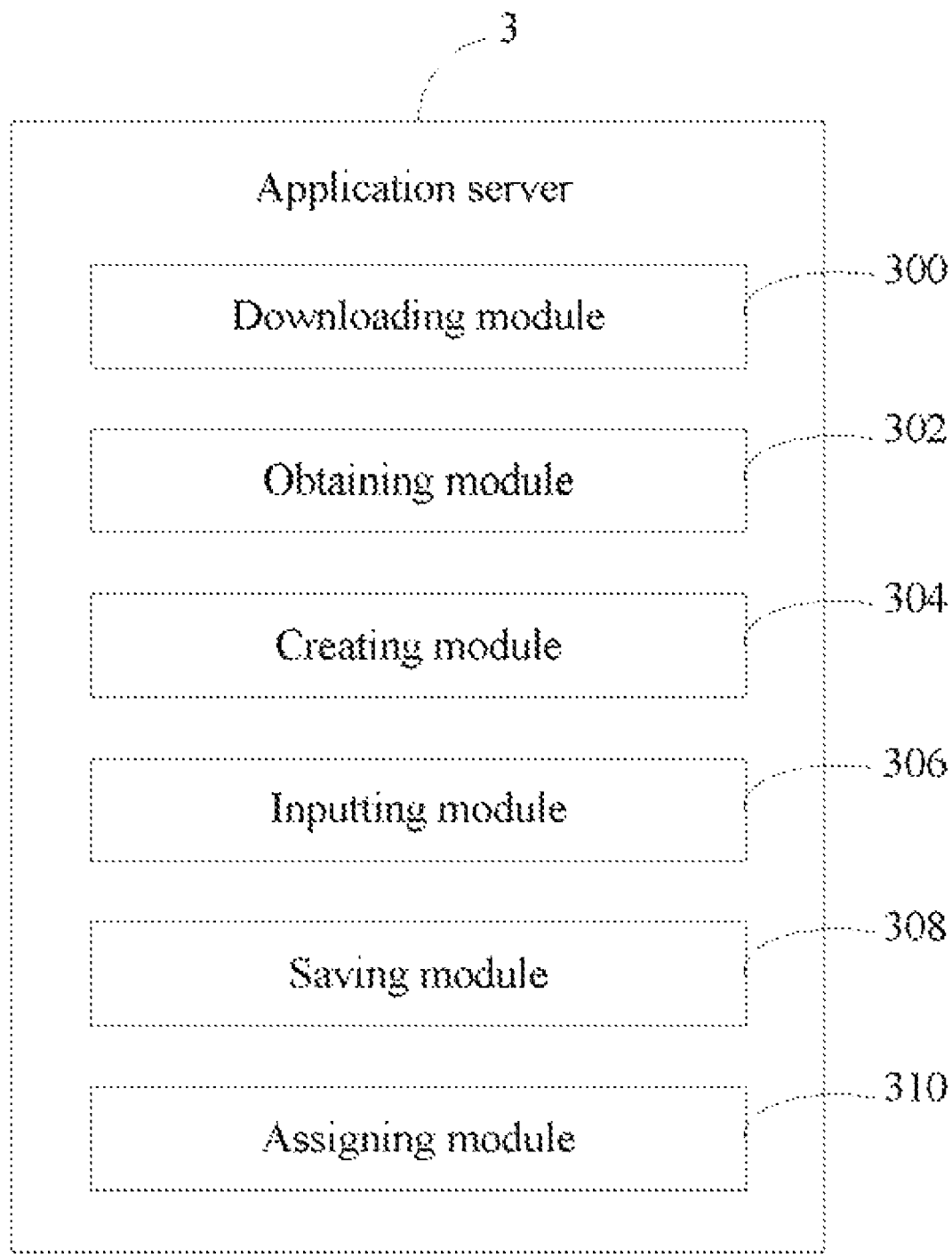
FIG. 2 is a schematic diagram of main function unit of the application server of FIG. 1.

FIG. 2 is a schematic diagram of main function units of the application server 3. The application server 3 typically includes a downloading module 300, an obtaining module 302, a creating module 304, an inputting module 306, a saving module 308 and an assigning module 310.

The downloading module 300 is configured for downloading the bill of materials of the product from the first database 1 according to a serial number and an edition of the product, and saving the downloaded bill of materials in the application server 3. The bill of materials includes information of all materials used for manufacturing the product, for example, serial numbers and editions of the materials.

The downloading module 300 is also configured for downloading a production order from the second database 2 according to a corresponding production order number, and saving the downloaded production order in the application server 3. The production order includes product information and manufacturing information. The product information includes a serial number of the product and an edition of the product. The manufacturing information includes manufacturing quantity and a manufacturing date.

The downloading module 300 is further configured for downloading received materials delivery receipts from the second database 2 according to corresponding numbers of the received materials delivery receipts, and saving the downloaded received materials delivery receipts to the application server 3. Each received materials delivery receipt information includes a serial number of received materials delivery receipt, supplier code number, supplier name, received materials date, and received materials quantity.

The obtaining module 302 is configured for obtaining product information and manufacturing information from the downloaded production order.

The obtaining module 302 is also configured for obtaining serial numbers and editions of the materials used in manufacturing the product from the downloaded bill of materials.

The obtaining module 302 is further configured for obtaining received materials information from the downloaded received materials delivery receipts.

The creating module 304 is configured for creating a manufacturing check list according to the above obtained information. The manufacturing check list includes the product information, the manufacturing information, the serial numbers and editions of the materials and the received materials delivery receipts information.

The inputting module 306 is configured for inputting information of related check operators and information of related approve operators to the manufacturing check list. The information of the related check operators and information of related approve operators may be name or work identification of the related check operators and approve operators. The related check operator checks information of the manufacturing check list, the approve operator approves the manufacturing check list checked by the related operator.

The saving module 308 is also configured for saving the manufacturing check list in the application server 3, and creating a serial number of the manufacturing check list.

The assigning module 310 is configured for assigning one or more preconfigured product tracking numbers stored in the application server 3 to the manufacturing check list.

Figure 3:
FIG. 3 is a flowchart of a preferred method for managing a product manufacturing process in accordance with a preferred embodiment.

FIG. 3 is a flowchart of a preferred method for managing the product manufacturing process in accordance with the preferred embodiment. In step S10, the downloading module 300 downloads the bill of materials of the product from the first database 1 according to a serial number and an edition of the product, and saves downloaded bill of materials in the application server 3.

In step S12, the downloading module 300 downloads a production order of the product from the second database 2 according to a corresponding production order number, and saves downloaded production order in the application server 3.

In step S14, the downloading module 300 downloads received materials delivery receipts from the second database 2 according to corresponding numbers of the received materials delivery receipts, and saves downloaded received materials delivery receipts in the application server 3.

In step S16, the obtaining module 302 obtains product information from the downloaded production order.

In step S18, the obtaining module 302 obtains manufacturing information from the downloaded production order.

In step S20, the obtaining module 302 obtains serial numbers and editions of corresponding materials used in manufacturing the product from the downloaded bill of materials.

In step S22, the obtaining module 302 obtains received materials information from the downloaded received materials delivery receipts.

In step S24, the creating module 304 creates a manufacturing check list according to the above obtained information.

In step S26, the inputting module 306 inputs information of related check operators and information of related approve operators to the manufacturing check list.

In step S28, the saving module 308 saves the manufacturing check list in the application server 3, and creates a serial number of the manufacturing check list.

In step S30, the assigning module 310 assigns one or more preconfigured product tracking numbers stored in the application server 3 to the manufacturing check list.

Although the present invention has been specifically described on the basis of a preferred embodiment and a preferred method, the invention is not to be construed as being limited thereto. Various converts or modifications may be made to said embodiment and method without departing from the scope and spirit of the invention.

What is claimed is:

1. A system for managing a product manufacturing process comprising a first database, a second database, and an application server electronically connected with the first database and the second database via a network, the application server comprising:

a downloading module for downloading a bill of materials of the product from the first database according to a serial number and an edition of the product and saving the downloaded bill of materials, downloading a production order of the product from the second database according to a corresponding production order number and saving the downloaded production order, and downloading received materials delivery receipts from the second database according to corresponding numbers of the received materials delivery receipts and saving the downloaded received materials delivery receipts;

an obtaining module for obtaining product information from the downloaded production order, obtaining manufacturing information from the downloaded production order, obtaining serial numbers and editions of corresponding materials used in manufacturing the product from the downloaded bill of materials, and obtaining received materials information from the downloaded received materials delivery receipts;

a creating module for creating a manufacturing check list according to the above obtained information, the manufacturing check list comprising the product information, the manufacturing information, the serial numbers and editions of the materials and the received materials delivery receipts information;

a saving module for saving the manufacturing check list in the application server, and creating a serial number of the manufacturing check list; and an assigning module for assigning one or more preconfigured product tracking numbers stored in the application server to the manufacturing check list.

2. The system as claimed in claim 1, wherein the application server further comprises:

an inputting module for inputting information of related check operators and information of related approve operators to the manufacturing check list.

3. A computer-based method for managing a product manufacturing process, the method comprising:

downloading a bill of materials of the product from a first database according to a serial number and an edition of the product, and saving the downloaded bill of materials in an application server;

downloading a production order of the product from a second database according to a corresponding production order number, and saving the downloaded production order in the application server;

downloading received materials delivery receipts from the second database according to corresponding numbers of the received materials delivery receipts, and saving the downloaded received materials delivery receipts in the application server;

obtaining product information from the downloaded production order;

obtaining manufacturing information from the downloaded production order;

obtaining serial numbers and editions of corresponding materials used in manufacturing the product from the downloaded bill of materials;

obtaining received materials information from the downloaded received materials delivery receipts;

creating a manufacturing check list according to the above obtained information, the manufacturing check list comprising the product information, the manufacturing information, the serial numbers and editions of the materials and the received materials delivery receipts information; and saving the manufacturing check list in the application server, and creating a serial number of the manufacturing check list; and assigning one or more preconfigured product tracking numbers stored in the application server to the manufacturing check list.

4. The method as claimed in claim 3, further comprising:

inputting information of related check operators and information of related approve operators to the manufacturing check list.

* * * * *